Jan. 13, 1931.  C. E. VAN NORMAN  1,788,475
FEED MECHANISM FOR GRINDING MACHINES
Original Filed April 29, 1926
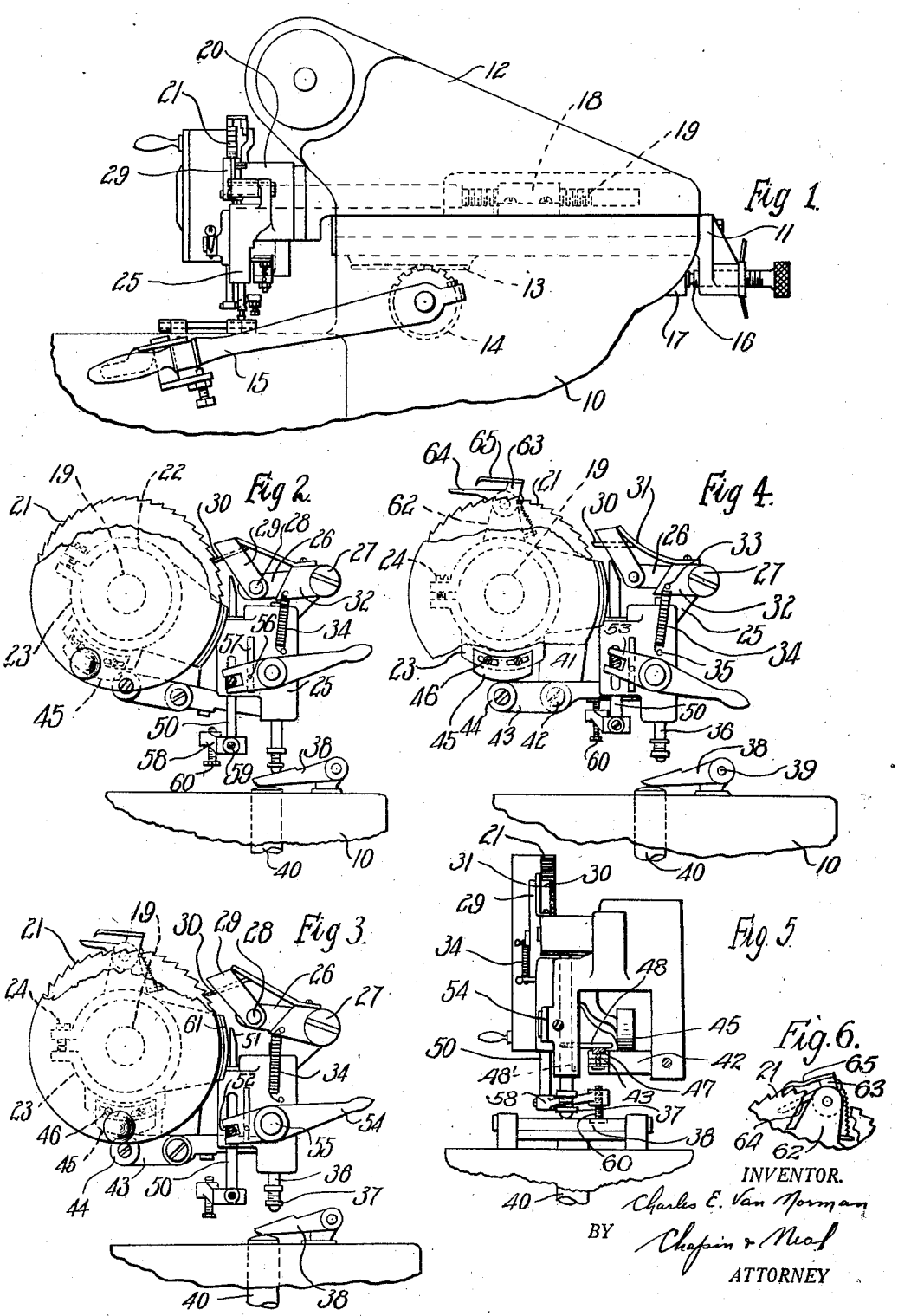
INVENTOR.
Charles E. Van Norman
BY
Chapin & Neal
ATTORNEY Patented Jan. 13, 1931

1,788,475

UNITED STATES PATENT OFFICE

CHARLES E. VAN NORMAN, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS

FEED MECHANISM FOR GRINDING MACHINES

Original application filed April 29, 1926, Serial No. 105,458. Divided and this application filed April 17, 1928. Serial No. 270,696.

This invention relates to precision grinding machines or the like, and has particular reference to mechanism for causing an accurate progressive step-by-step feeding movement of an element of the machine such as the grinding head in order to cause the work to be gradually reduced in size to the degree desired. One object of the invention is to provide a quick acting means for stopping the feeding action without affecting the setting of the machine, so that feeding may be resumed immediately when necessary. Another object is to provide mechanism by which a relatively rapid feed for rough cutting may be maintained as long as possible, and a decrease in the speed for the finishing cut made without loss of time. Another object is to provide means for adjusting the feed mechanism to accommodate the progressive wear of the grinding wheel without changing the relative action of the feed decrease and the automatic stop mechanism. Further objects will appear from the following specification and claims.

Referring to the drawings:

Fig. 1 is a side elevation of the tool head of a grinding machine embodying my invention;

Fig. 2 is a view on a larger scale of certain mechanism shown in Fig. 1, looking from the left in that figure;

Fig. 3 and Fig. 4 are similar views showing the parts in different positions of operation;

Fig. 5 is a side elevation of the mechanism shown in Fig. 2; and

Fig. 6 is a detail, illustrating the operation of certain parts.

The machine is shown as a whole in my prior application Serial No. 105,458 filed April 29, 1926, of which the present case is a division. The work holding head is not shown in the present case as not necessary for an understanding of the invention, which is shown as applied to the tool head. It will be understood, however, that instead of feeding the grinding tool towards the work the work might be fed towards the tool, and in such case the mechanism herein described would be applied to the work head.

Referring now to the example shown, the machine is carried on a base 10, mounted in which is a slide 11 and a tool carrying slide 12. The slide 11 carries a rack 13 engaged by a pinion 14 operable through a handle 15 to give a quick movement to the slide, useful in backing the tool away from the work head when a fresh work piece is to be inserted. When the feed mechanism to be described is operating a stop 16 on the slide 11 is in contact with an abutment 17 on the base.

Fastened to slide 11 is a nut 18 engaging a screw 19 which is rotatable but axially fixed in the slide 12. The screw 19 passes through a bearing member 20 and carries a ratchet wheel 21. Upon a hub 22 of this ratchet is positioned a member 23, carrying certain parts to be described and held frictionally in place by a clamp screw 24. The frictional engagement is sufficient to hold the member and the ratchet together during the normal operation of the machine, but permits them to have a relative adjusting movement to provide a take-up as the grinding element gradually wears away.

Upon a bracket 25 carried by the bearing member 20 is a pawl carrier 26 pivoted upon a stud 27. Pivoted at 28 to this pawl carrier is a pawl 29 having a detent 30 engaging the teeth of the ratchet 21, the pawl being pressed towards the ratchet by a spring 31. A strike plate 32 movable with the pawl carrier has a pin 33 to which is attached a spring 34 having its other end fastened to a pin 35 on the bracket 25. A rod 36 slides through the bracket 25 in position to strike the plate 32 and bears at its lower end an adjustable tappet 37. A rocking plate 38 is pivoted to the base 10 at 39 and is oscillated by a vertically reciprocating rod 40, which may be actuated by any desired means, as for example, that shown in my reissued patent 13,892 dated March 16, 1915.

The motion of the rod 40, and hence of the rocking plate 38, is constant, but the effect of it upon the rod 36 varies with the initial distance of rod 36 above the plate. This distance is in the present instance subject to three separate controls: the adjustable tappet 37, an automatic cam-operated control operable to reduce the feed at a predetermined time in the operation of the machine, and a hand-operated throw-off by means of which the feed may be discontinued temporarily at any desired instant. The tappet 37 acts as a vernier adjustment of the feed, and is set to the proper spacing above the rocker 38 so that the rough feed given to the tool head during the intial portion of the grinding operation will be of the desired magnitude.

The cam control is secured by the following mechanism: Pivoted to an extension 41 of the bearing 20 as at 42 is a rocker 43 carrying at one end a cam roll 44. This roll coacts with a cam 45 carried on the member 23 previously described, being preferably secured in place by a screw and slot connection 46 so that its position may be regulated. The other end of the rocker carries a screw 47 which lies in the path of a pin 48 fastened to the rod 36 and extending rearwardly through a slot 48' in the bracket 25. When the end of the rocker carrying the screw is raised by the cam the screw acts as an abutment limiting the downward movement of the rod 36 and, therefore, decreasing the upward movement which the rod is given by the rocker 38.

If it is desired to interrupt the feeding of the work head temporarily at any time the detent 30 is removed from engagement with the ratchet teeth by the following mechanism: Slidable in the bracket 25 is a rod 50 movable towards and away from the pawl 29, the upper end 51 of which is adapted to strike the lower side of the pawl. The end of the rod is preferably beveled as shown, so as to lie closer to the pawl and present a striking surface substantially parallel to that offered by the pawl. A pin 52 on this rod extends through a slot in the bracket and engages the forked end 53 of a lever 54 pivoted upon the bracket at 55. To hold the lever in either extreme position, a pin 56 thereon bears against a stationary spring or friction plate 57.

Besides moving the pawl out of contact with the ratchet the lever 54 preferably also raises the rod 36 so that it is either out of contact with the rocker 38 or has its motion so much reduced that it cannot move the pawl into contact with the ratchet; and also removes cam roll 44 from contact with the cam 45. This is accomplished through a bracket 58 secured by a set screw 59 to the lower end of the rod 50 and bearing an adjustable stop screw 60 which, when the rod is raised, strikes the rocker 43 and tilts it in the same direction as when its cam roll 44 is engaged by the cam 45.

It will be observed that if the handle part of the lever 54 is pressed smartly downwardly the pawl 29 will be struck a quick hammer blow by the rod end 51. This action effectively disengages the detent 30 from the ratchet teeth, and, as the handle stays in its extreme position until moved back by the operator, holds the pawl out of contact even though the rod 40 is continually moved up and down by its actuating mechanism.

To stop the feed of the work head a predetermined time after the start of the slow or finishing feed, a plate 61 is carried upon the member 23. This plate passes between the detent 30 and the ratchet wheel to stop further feeding motion. Also secured to the member 23 is an extension 62 having pivoted thereto a member 63 formed with a handle 64 and a flexible pawl 65. If the handle is depressed the pawl will be brought into engagement with the ratchet teeth, and due to the flexibility of the pawl and the frictional engagement of member 23 with the hub of the ratchet wheel, the member and ratchet will be shifted slightly relative to each other. The action is illustrated more particularly in Fig. 6, which shows the handle 64 in depressed position. As the handle is depressed, the member 63 is swung on its pivot, causing the anchored end of the pawl 65 to move to the left. The flexibility of the pawl permits it to bend as its free end is held by a ratchet tooth but the pawl end is moved to the left as the member 63 tilts, causing relative movement between the member 23, which carries the pawl pivot and also plate 61, and the ratchet 21. This is desirable occasionally in the operation of the machine in order to compensate for the wear on the grinding wheel carried by the tool head.

It will be observed that when handle 64 is depressed the cam 45 and the plate 61 are both shifted relative to the ratchet wheel but preserve their angular relation relative to each other. The amount of the slow feed preceding its termination by plate 61 is thus unaffected by the adjustment for wear of the grinding wheel.

I claim:

1. A grinding machine having feed mechanism including a ratchet, a pawl carrier movably mounted adjacent the ratchet, a pawl movably mounted on the pawl carrier and engageable with the teeth of the ratchet, means for moving the pawl carrier periodically to cause movement of the pawl and ratchet, and manually operable mechanism having engagement both with the pawl and the pawl carrier for disengaging the pawl from the ratchet and moving the pawl carrier out of the range of the said means.

2. A grinding machine having feed mechanism including a ratchet, a pawl carrier movably mounted adjacent the ratchet, a pawl movably mounted on the pawl carrier and engageable with the teeth of the ratchet, means for moving the pawl carrier periodically to cause movement of the pawl and ratchet, and means manually movable against the pawl at a point removed from its ratchet-engaging surface and with an impact blow to disengage it completely from the ratchet.

3. A grinding machine having feed mechanism including a ratchet, pawl mechanism operable to advance the ratchet step by step, a member frictionally held to the ratchet, a cam carried by said member, mechanism operable by the cam to decrease the feeding movement of the pawl mechanism, a plate also carried by said member positioned to pass between the pawl and ratchet to prevent further feeding action, and means for adjusting the member relative to the ratchet.

4. A grinding machine having feed mechanism including a ratchet, pawl mechanism operable to advance the ratchet step by step, means for decreasing the advancing motion of the pawl mechanism at a predetermined period in the operation of the ratchet, means for disengaging the pawl from the ratchet at a predetermined period in the operation of the ratchet, and a device for adjusting said two means simultaneously with regard to the ratchet without varying their positions with respect to each other.

5. A grinding machine having feed mechanism including a ratchet, a bearing member adjacent the ratchet, a pawl carrier pivoted to said member, a pawl pivoted to the pawl carrier, a pair of slides reciprocable in said member one of which engages the pawl carrier and the other the pawl, means for imparting reciprocating motion to the carrier-engaging slide, and a handle pivoted to said member and engageable with pawl-engaging slide to move the pawl out of engagement with the ratchet.

6. A grinding machine having feed mechanism including a ratchet, a bearing member adjacent the ratchet, a pawl carrier pivoted to said member, a pawl pivoted to the pawl carrier and engageable with the ratchet, a pair of slides reciprocable in said member, one of which engages the pawl carrier and the other the pawl, a device having a constant amplitude of motion engaging said carrier-engaging slide, a rocker pivoted to said member and also engageable with the carrier-engaging slide to limit its motion towards said device, a rocker actuating cam rotatable with the ratchet, a handle pivoted to said member and engageable with the pawl-engaging slide whereby the latter may be moved to disengage the pawl from the ratchet, and a connection between said pawl engaging slide, and a handle pivoted to said latter will be actuated independently of the cam.

7. A grinding machine having feed mechanism including a ratchet, a pawl carrier movably mounted adjacent the ratchet, a pawl movably mounted on the pawl carrier and engageable with the teeth of the ratchet, means for moving the pawl carrier periodically to cause movement of the pawl and ratchet, and a pawl lifter member mounted for movement towards and away from the pawl independently of the pawl's own state of motion for imparting an impact blow against the pawl to disengage it from the ratchet.

8. A grinding machine having feed mechanism including a ratchet, a pawl carrier movably mounted adjacent the ratchet, a pawl movably mounted on the pawl carrier and engageable with the teeth of the ratchet, a pawl lifter mounted for movement towards and away from the pawl, automatically operating means for varying the amplitude of movement of the pawl carrier during the sequence of its operation, and means for moving the pawl lifter to cause displacement of the pawl from its contact with the ratchet by an impact blow against the pawl imparted through movement of the pawl lifter.

In testimony whereof I have affixed my signature.

CHARLES E. VAN NORMAN.

CERTIFICATE OF CORRECTION.

Patent No. 1,788,475.            Granted January 13, 1931, to

CHARLES E. VAN NORMAN.

It is hereby certified that error appears in the printed specification of the above numbered patent requiring correction as follows: Page 3, line 58, claim 6, strike out the comma and words ", and a handle pivoted to said" and insert instead and the rocker whereby the; and that the said Letters Patent should be read with this correction therein that the same may conform to the record of the case in the Patent Office.

Signed and sealed this 17th day of February, A. D. 1931.

(Seal)

M. J. Moore,
Acting Commissioner of Patents.